US012570061B2

(12) United States Patent (10) Patent No.: US 12,570,061 B2
Uotani (45) Date of Patent: Mar. 10, 2026

(54) PRODUCTION METHOD FOR RETREADED TIRE AND RETREADED TIRE

(71) Applicant: Sumitomo Rubber Industries, Ltd., Hyogo (JP)

(72) Inventor: Ryota Uotani, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 47 days.

(21) Appl. No.: 18/630,487

(22) Filed: Apr. 9, 2024

(65) Prior Publication Data

US 2024/0343009 A1 Oct. 17, 2024

(30) Foreign Application Priority Data

Apr. 12, 2023 (JP) ................................. 2023-065111

(51) Int. Cl.
B29D 30/54 (2006.01)
B60C 11/02 (2006.01)
(Continued)

(52) U.S. Cl.
CPC .............. B29D 30/54 (2013.01); B60C 11/02 (2013.01); B60C 19/00 (2013.01);
(Continued)

(58) Field of Classification Search
CPC . B29C 30/54; B29C 30/56; B29C 2030/0077; B29C 2030/0083; B29C 2030/541; B29D 30/54; B29D 30/56; B29D 2030/0077; B29D 2030/0083; B29D 2030/541
See application file for complete search history.

(56) References Cited

U.S. PATENT DOCUMENTS

| | | | |
|---|---|---|---|
| 2008/0289736 A1* | 11/2008 | Adamson | B29D 30/0061 156/110.1 |
| 2019/0143760 A1* | 5/2019 | Kanaya | B60C 3/04 152/554 |

(Continued)

FOREIGN PATENT DOCUMENTS

| | | | |
|---|---|---|---|
| EP | 3711974 A1 * | 9/2020 | C08L 9/06 |
| JP | 06-171319 A * | 6/1994 | |

(Continued)

OTHER PUBLICATIONS

Machine translation for Japan 08-025515 (Year: 2025).*

(Continued)

*Primary Examiner* — Steven D Maki
(74) *Attorney, Agent, or Firm* — Studebaker Brackett PLLC

(57) ABSTRACT

A method for producing a retreaded tire 2 includes a step of shaving a tread 104 from a tire 102, a step of attaching a tag member 30 to a formed surface BD made by shaving the tread 104, and a step of reconstructing a new tread 4. The formed surface BD is located radially outward of a maximum width position of the tire 2. The tag member 30 is located radially inward of an end of a belt 14. An initial vulcanization time t10 of a rubber composition for a protector 34 of the tag member 30 is shorter than an initial vulcanization time t10 of a rubber composition for the new tread 4.

12 Claims, 8 Drawing Sheets

(51) Int. Cl.
    *B60C 19/00*      (2006.01)
    *B29D 30/00*      (2006.01)
    *B29D 30/56*      (2006.01)

(52) U.S. Cl.
    CPC ................ *B29D 2030/0083* (2013.01); *B29D 2030/541* (2013.01); *B29D 30/56* (2013.01)

(56)            References Cited

U.S. PATENT DOCUMENTS

| | | | |
|---|---|---|---|
| 2020/0148016 A1* | 5/2020 | Nagayoshi ....... | G06K 19/07764 |
| 2025/0236752 A1* | 7/2025 | Palumbi .............. | C09D 107/00 |

FOREIGN PATENT DOCUMENTS

| | | | |
|---|---|---|---|
| JP | 08-025515 A | * | 1/1996 |
| JP | 2006-335031 A | * | 12/2006 |
| JP | 2007-210297 A | * | 8/2007 |
| JP | 2009-126111 A | | 6/2009 |
| JP | 2014-076765 A | * | 5/2014 |

OTHER PUBLICATIONS

Machine translation for Japan 2007-210297 (Year: 2025).*
Machine translation for Japan 2006-335031 (Year: 2025).*
Machine translation for Japan 2014-076765 (Year: 2025).*
Machine translation for Japan 06-171319 (Year: 2025).*

\* cited by examiner

PRODUCTION METHOD FOR RETREADED TIRE AND RETREADED TIRE

BACKGROUND OF THE INVENTION

Field of the Invention

The present invention relates to a production method for a retreaded tire and a retreaded tire.

Background Art

It has been proposed to apply radio frequency identification (RFID) tags to tires in order to manage information such as manufacturing management, customer information, running history, etc., of tires.

In Japanese Laid-Open Patent Publication No. 2009-126111, application of RFID tags to a manufacturing management system for retreaded tires is considered. In Japanese Laid-Open Patent Publication No. 2009-126111, an RFID tag is movably placed inside a tire.

For tires in which no RFID tag is incorporated, if RFID tags are mounted thereon, information thereof can be managed in the same manner as for tires in which RFID tags are incorporated.

For tires in which no RFID tag is incorporated, an attempt to mount RFID tags on the tires in after-sales service for the tires is under consideration.

An object of the present invention is to provide a retreaded tire in which an RFID tag is mounted on a tire in which no RFID tag is incorporated while formation of a good communication environment and reduction of the risk of damage due to the RFID tag are taken into consideration, and that enables information management with the RFID tag.

SUMMARY OF THE INVENTION

A production method for a retreaded tire according to the present invention is a method for producing a retreaded tire including a tag member including a protector which is a crosslinked product of a rubber composition and an RFID tag which is enclosed in the protector. The production method includes the steps of: from a tire including a pair of beads, a carcass extending on and between the pair of beads, a tread located radially outward of the carcass and configured to come into contact with a road surface, a belt stacked on the carcass on a radially inner side of the tread, and a pair of sidewalls located axially outward of the carcass, shaving the tread; attaching the tag member in which the protector is in an unvulcanized state, to a formed surface made by shaving the tread; and reconstructing a new tread which is a crosslinked product of a rubber composition, on the formed surface to which the tag member has been attached. The formed surface is located radially outward of a maximum width position of the tire. The tag member is located radially inward of an end of the belt. An initial vulcanization time t10 of the rubber composition for the protector is shorter than an initial vulcanization time t10 of the rubber composition for the new tread.

A retreaded tire according to the present invention includes: a base tire having a formed surface made by shaving a tread of a tire; a new tread reconstructed on the formed surface of the base tire; and a tag member located between the base tire and the new tread. The base tire includes a pair of beads, a carcass extending on and between the pair of beads, a tread located radially outward of the carcass and configured to come into contact with a road surface, a belt stacked on the carcass on a radially inner side of the tread, and a pair of sidewalls located axially outward of the carcass. The tag member includes a protector which is a crosslinked product of a rubber composition and an RFID tag which is enclosed in the protector. The tag member is located between an end of the belt and a maximum width position of the tire in a radial direction. The new tread is a crosslinked product of a rubber composition. A complex elastic modulus of the protector is the same as a complex elastic modulus of the sidewall, or higher than the complex elastic modulus of the sidewall. The complex elastic modulus of the protector is lower than a complex elastic modulus of the new tread.

According to the present invention, a retreaded tire, in which an RFID tag is mounted on a tire in which no RFID tag is incorporated while formation of a good communication environment and reduction of the risk of damage due to the RFID tag are taken into consideration, is obtained. Since the RFID tag is fixed to the retreaded tire, risks, such as peeling of the RFID tag and intentional replacement of the RFID tag with another RFID tag, are reduced. This retreaded tire can increase the reliability of information written in the RFID tag. This retreaded tire enables information management with the RFID tag.

DETAILED DESCRIPTION

Figure 1:
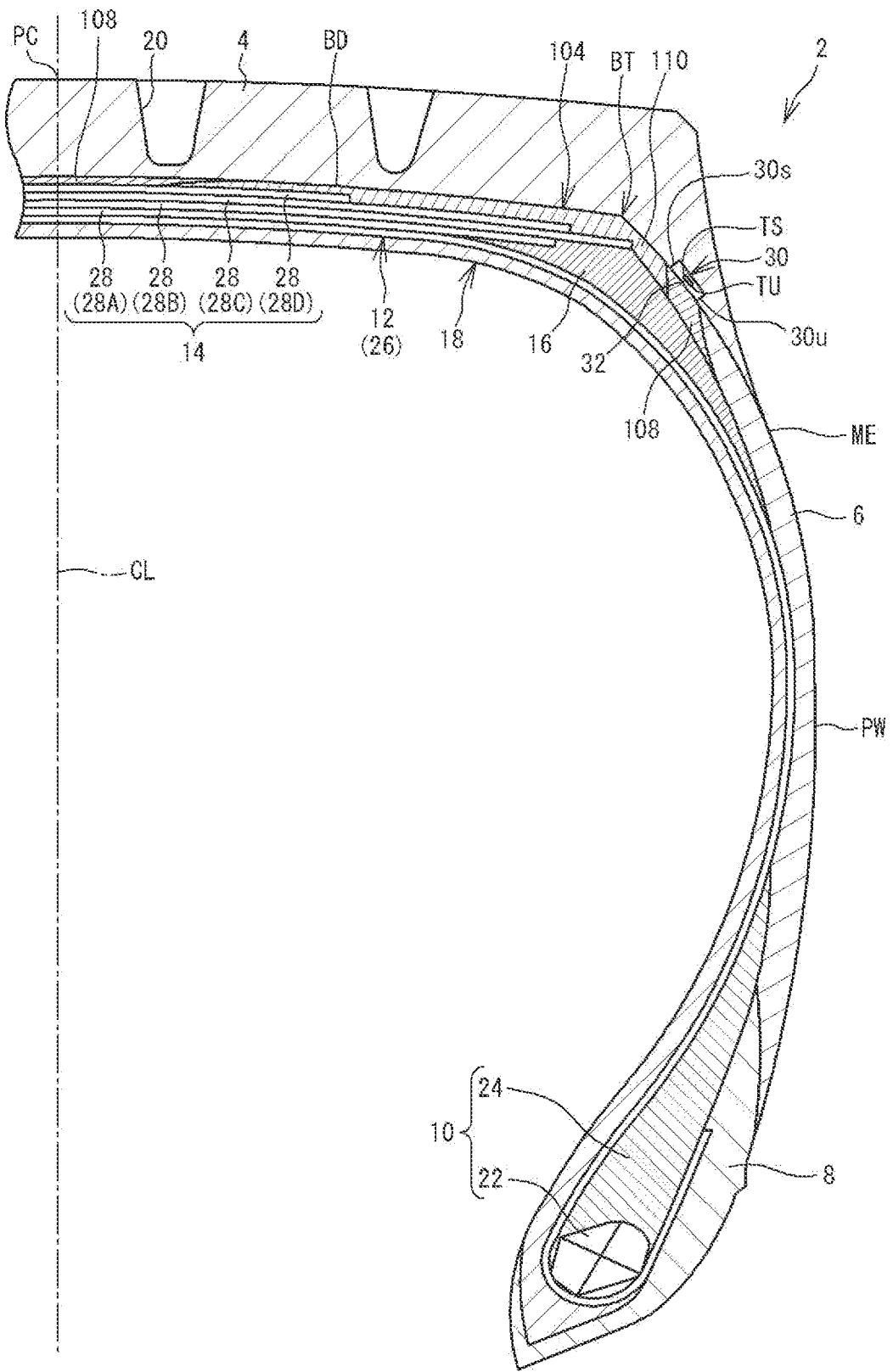
FIG. 1 is a cross-sectional view showing a part of a retreaded tire.

A tire of the present invention is fitted on a rim. The inside of the tire is filled with air to adjust the internal pressure of the tire. The tire fitted on the rim is also referred to as tire-rim assembly. The tire-rim assembly includes the rim and the tire fitted on the rim.

In the present invention, a state where a tire is fitted on a standardized rim, the internal pressure of the tire is adjusted to a standardized internal pressure, and no load is applied to the tire is referred to as standardized state.

In the present invention, unless otherwise specified, the dimensions and angles of each component of the tire are measured in the standardized state.

The dimensions and angles of each component in a meridian cross-section of the tire, which cannot be measured in a state where the tire is fitted on the standardized rim, are measured in a cut plane of the tire obtained by cutting the tire along a plane including a rotation axis. In this measurement, the tire is set such that the distance between right and left beads is equal to the distance between the beads in the tire that is fitted on the standardized rim. The configuration of the tire that cannot be confirmed in a state where the tire is fitted on the standardized rim is confirmed in the above-described cut plane.

The standardized rim means a rim specified in a standard on which the tire is based. The "standard rim" in the JATMA standard, the "Design Rim" in the TRA standard, and the "Measuring Rim" in the ETRTO standard are standardized rims.

The standardized internal pressure means an internal pressure specified in the standard on which the tire is based. The "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard are standardized internal pressures.

A standardized load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are standardized loads.

In the present invention, a tread portion of the tire is a portion of the tire that comes into contact with a road surface. A bead portion is a portion of the tire that is fitted to a rim. A sidewall portion is a portion of the tire that extends between the tread portion and the bead portion. The tire includes a tread portion, a pair of bead portions, and a pair of sidewall portions as portions thereof.

A boundary portion between the tread portion and each sidewall portion is also referred to as buttress.

A center portion of the tread portion is also referred to as crown portion. A portion of the tread portion at an end thereof is also referred to as shoulder portion.

In the present invention, a rubber composition is obtained by mixing a base rubber and chemicals in a kneading machine such as a Banbury mixer. The rubber composition is a composition containing the uncrosslinked base rubber. A crosslinked rubber refers to a crosslinked product, of the rubber composition, obtained by pressurizing and heating the rubber composition. The crosslinked rubber contains a crosslinked product of the base rubber. The crosslinked rubber is also referred to as vulcanized rubber, and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Selection of a base rubber and chemicals, the amounts of the selected chemicals, etc., are determined as appropriate according to the specifications of components, such as a tread and a sidewall, for which the rubber composition is used. In the present invention, unless otherwise specified, a rubber composition that is generally used in tires is used.

In the present invention, when, in a vulcanization rate curve at 160° C. obtained using an oscillating disc curemeter specified in JIS K6296-2, the minimum value of torque is denoted by ML, the maximum value of torque is denoted by MH, and the difference (MH−ML) therebetween is denoted by ME, an initial vulcanization time $t10$ of a rubber composition refers to a time taken for the torque to reach ML+0.1ME. The maximum value MH of the torque is represented by the torque reached after 15 minutes from the start of the test.

In the present invention, a complex elastic modulus E* of a component formed from a crosslinked rubber, of the components included in the tire, is measured according to the standards of JIS K6394. The measurement conditions are as follows.

Initial strain=10%
Dynamic strain=±1%
Frequency=10 Hz
Mode=stretch mode
Temperature=70° C.

In this measurement, a test piece (a length of 20 mm× a width of 4 mm× a thickness of 1 mm) is sampled from the tire. The length direction of the test piece is caused to coincide with the circumferential direction of the tire. When a test piece cannot be sampled from the tire, a test piece is sampled from a sheet-shaped crosslinked rubber (hereinafter, also referred to as rubber sheet) obtained by pressurizing and heating a rubber composition, which is used for forming the component to be measured, at a temperature of 170° C. for 12 minutes.

In the present invention, the complex elastic modulus E* of the component formed from the crosslinked rubber is represented as a complex elastic modulus at 70° C. The higher the complex elastic modulus is, the harder the crosslinked rubber is. The lower the complex elastic modulus is, the softer the crosslinked rubber is.

[Findings on which Present Invention is Based]

As described above, for tires in which no RFID tag is incorporated, an attempt to mount RFID tags on the tires in after-sales service for the tires is under consideration.

One method for mounting an RFID tag is to attach the RFID tag to a tire. This method allows the RFID tag to be easily mounted on the tire. However, with this method, the RFID tag cannot be fixed to the tire, and thus risks, such as peeling of the RFID tag and intentional replacement of the RFID tag with another RFID tag, are assumed.

In the production of a retreaded tire, an old worn tread is shaved, and a new tread is reconstructed thereon. If the timing of reconstructing the new tread is utilized, an RFID tag can be incorporated into the tire. In this case, the RFID tag is fixed to the tire, and thus risks, such as peeling of the RFID tag and intentional replacement of the RFID tag with another RFID tag, are reduced. The retreaded tire can increase the reliability of information written in the RFID tag.

In this regard, the tread of a tire becomes deformed when coming into contact with a road surface, and becomes restored when separating from the road surface. Therefore, depending on the position of the incorporated RFID tag, strain may be concentrated on the RFID tag, which may damage the RFID tag or may cause damage starting from the RFID tag.

A belt is located radially inward of the tread. The belt includes steel cords as belt cords. If an RFID tag is placed near a metal component such as steel cords, there is a concern that radio waves may be disturbed.

Therefore, the present inventor has conducted a thorough study for a technology capable of producing a retreaded tire in which an RFID tag is incorporated while taking into consideration formation of a good communication environment and reduction of the risk of damage due to the RFID tag, leading to completion of the invention described below.

Outline of Embodiments of Present Invention

[Configuration 1]

A production method for a retreaded tire according to an aspect of the present invention is a method for producing a retreaded tire including a tag member including a protector which is a crosslinked product of a rubber composition and an RFID tag which is enclosed in the protector, the method including the steps of: from a tire including a pair of beads, a carcass extending on and between the pair of beads, a tread located radially outward of the carcass and configured to come into contact with a road surface, a belt stacked on the carcass on a radially inner side of the tread, and a pair of sidewalls located axially outward of the carcass, shaving the tread; attaching the tag member in which the protector is in an unvulcanized state, to a formed surface made by shaving the tread; and reconstructing a new tread which is a cross-linked product of a rubber composition, on the formed surface to which the tag member has been attached, wherein the formed surface is located radially outward of a maximum width position of the tire, the tag member is located radially inward of an end of the belt, and an initial vulcanization time t10 of the rubber composition for the protector is shorter than an initial vulcanization time t10 of the rubber composition for the new tread.

With the production method for the retreaded tire, a retreaded tire, in which an RFID tag is mounted on a tire in which no RFID tag is incorporated while formation of a good communication environment and reduction of the risk of damage due to the RFID tag are taken into consideration, is obtained. Since the RFID tag is fixed to the retreaded tire, risks, such as peeling of the RFID tag and intentional replacement of the RFID tag with another RFID tag, are reduced. This retreaded tire can increase the reliability of information written in the RFID tag. This retreaded tire enables information management with the RFID tag.

[Configuration 2]

Preferably, in the production method for a retreaded tire described in [Configuration 1] above, the initial vulcanization time t10 for the protector is not longer than 2.5 minutes.

[Configuration 3]

Preferably, in the production method for a retreaded tire described in [Configuration 1] or [Configuration 2] above, a complex elastic modulus of the protector is the same as a complex elastic modulus of the sidewall, or higher than the complex elastic modulus of the sidewall, and the complex elastic modulus of the protector is lower than a complex elastic modulus of the new tread.

[Configuration 4]

A retreaded tire according to an aspect of the present invention is a retreaded tire including: a base tire having a formed surface made by shaving a tread of a tire; a new tread reconstructed on the formed surface of the base tire; and a tag member located between the base tire and the new tread, wherein the base tire includes a pair of beads, a carcass extending on and between the pair of beads, a tread located radially outward of the carcass and configured to come into contact with a road surface, a belt stacked on the carcass on a radially inner side of the tread, and a pair of sidewalls located axially outward of the carcass, the tag member includes a protector which is a crosslinked product of a rubber composition and an RFID tag which is enclosed in the protector, the tag member is located between an end of the belt and a maximum width position of the tire in a radial direction, the new tread is a crosslinked product of a rubber composition, a complex elastic modulus of the protector is the same as a complex elastic modulus of the sidewall, or higher than the complex elastic modulus of the sidewall, and the complex elastic modulus of the protector is lower than a complex elastic modulus of the new tread.

With the retreaded tire, a good communication environment is formed, and the risk of damage due to the RFID tag is reduced. The retreaded tire can reduce risks such as peeling of the RFID tag and intentional replacement of the RFID tag with another RFID tag. The retreaded tire can increase the reliability of information written in the RFID tag. The retreaded tire enables information management with the RFID tag.

[Configuration 5]

Preferably, in the retreaded tire described in [Configuration 4] above, an initial vulcanization time t10 of the rubber composition for the protector is shorter than an initial vulcanization time t10 of the rubber composition for the new tread.

DETAILS OF EMBODIMENTS OF PRESENT INVENTION

Hereinafter, the present invention will be described in detail based on preferred embodiments with appropriate reference to the drawings.

FIG. 1 shows a part of a tire 2 according to one embodiment of the present invention. The tire 2 is mounted to a vehicle such as a truck and a bus. The tire 2 is a heavy duty tire.

FIG. 1 shows a part of a cross-section (hereinafter, referred to as meridian cross-section) of the tire 2 taken along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line CL extending in the radial direction in FIG. 1 represents the equator plane of the tire 2.

In FIG. 1, a position indicated by reference character PC is the point of intersection of the outer surface of the tire 2 and the equator plane CL. The point of intersection PC is the equator of the tire 2. In the case where a groove is located on the equator plane CL, the equator PC is specified on the basis of a virtual outer surface obtained on the assumption that no groove is provided thereon. The equator PC is also the radially outer end of the tire 2.

The tire 2 includes a tread 4, a pair of sidewalls 6, a pair of chafers 8, a pair of beads 10, a carcass 12, a belt 14, a pair of cushion layers 16, and an inner liner 18.

The tread 4 is located radially outward of the carcass 12. The tread 4 comes into contact with a road surface. The tread 4 is formed from a crosslinked rubber for which wear resistance and grip performance are taken into consideration.

The tread 4 has a complex elastic modulus of not less than 6 MPa and not greater than 9 MPa.

Grooves 20 are formed on the tread 4. Accordingly, a tread pattern is formed.

Each sidewall 6 is connected to an end of the tread 4. The sidewall 6 is located axially outward of the carcass 12. The sidewall 6 is formed from a crosslinked rubber. The sidewall 6 has a complex elastic modulus lower than that of the tread 4.

The complex elastic modulus of the sidewall 6 is not less than 2 MPa and not greater than 7 MPa.

A position indicated by reference character PW is an axially outer end of the tire 2 (hereinafter referred to as outer end PW). In the case where decorations such as patterns and letters are present on the outer surface of the tire 2, the outer end PW is specified on the basis of a virtual outer surface obtained on the assumption that the decorations are not present thereon. The tire 2 has a maximum width at the outer end PW.

In the present invention, the outer end PW obtained in the tire 2 in the standardized state is also referred to as maximum width position of the tire 2.

The sidewall 6 has a minimum thickness at the maximum width position PW.

The thickness of the sidewall 6 is not less than 3 mm and not greater than 7 mm at the maximum width position PW.

Each chafer 8 is located radially inward of the sidewall 6. The chafer 8 comes into contact with a rim (not shown). The chafer 8 is formed from a crosslinked rubber. The chafer 8 is harder than the sidewall 6.

Each bead 10 is located axially inward of the chafer 8. The bead 10 is located radially inward of the sidewall 6. The bead 10 includes a core 22 and an apex 24. Although not shown, the core 22 includes a wire made of steel and wound in the circumferential direction. The apex 24 is located radially outward of the core 22. The apex 24 is tapered. The apex 24 is formed from a hard crosslinked rubber.

The carcass 12 is located inward of the tread 4, the pair of sidewalls 6, and the pair of chafers 8. The carcass 12 extends on and between a first bead 10 and a second bead 10 which are the pair of beads 10.

The carcass 12 includes at least one carcass ply 26. The carcass 12 of the tire 2 is composed of one carcass ply 26. The carcass ply 26 is turned up from the inner side toward the outer side in the axial direction at each bead 10.

The carcass ply 26 includes a large number of carcass cords aligned with each other, which are not shown. These carcass cords intersect the equator plane CL. The carcass 12 has a radial structure.

The carcass cords of the tire 2 are steel cords. A cord formed from an organic fiber may be used as each carcass cord. Examples of the organic fiber include nylon fibers, rayon fibers, polyester fibers, and aramid fibers.

If the tire 2 is a tire for a small truck, a cord formed from an organic fiber is used as each carcass cord included in the carcass 12.

The belt 14 is located radially inward of the tread 4. The belt 14 is stacked on the carcass 12.

The belt 14 includes a plurality of belt plies 28 stacked in the radial direction. The belt 14 of the tire 2 includes four belt plies 28. The four belt plies 28 are a first belt ply 28A, a second belt ply 28B, a third belt ply 28C, and a fourth belt ply 28D which are aligned in the radial direction in this order. The first belt ply 28A is located on the innermost side in the radial direction. The second belt ply 28B has a largest width, and the fourth belt ply 28D has a smallest width.

Each belt ply 28 includes a large number of belt cords aligned with each other, which are not shown. Each belt cord is tilted relative to the equator plane CL. A steel cord is used as each belt cord of the tire 2.

Each cushion layer 16 is located between the belt 14 and the carcass 12 at an end of the belt 14. The cushion layer 16 is formed from a soft crosslinked rubber. The cushion layer 16 has a complex elastic modulus substantially equal to that of the sidewall 6.

The complex elastic modulus of the cushion layer 16 is not less than 1 MPa and not greater than 7 MPa.

The inner liner 18 is located inward of the carcass 12. The inner liner 18 forms an inner surface of the tire 2. The inner liner 18 is formed from a crosslinked rubber that has an excellent air blocking property. The inner liner 18 maintains the internal pressure of the tire 2.

Figure 2:
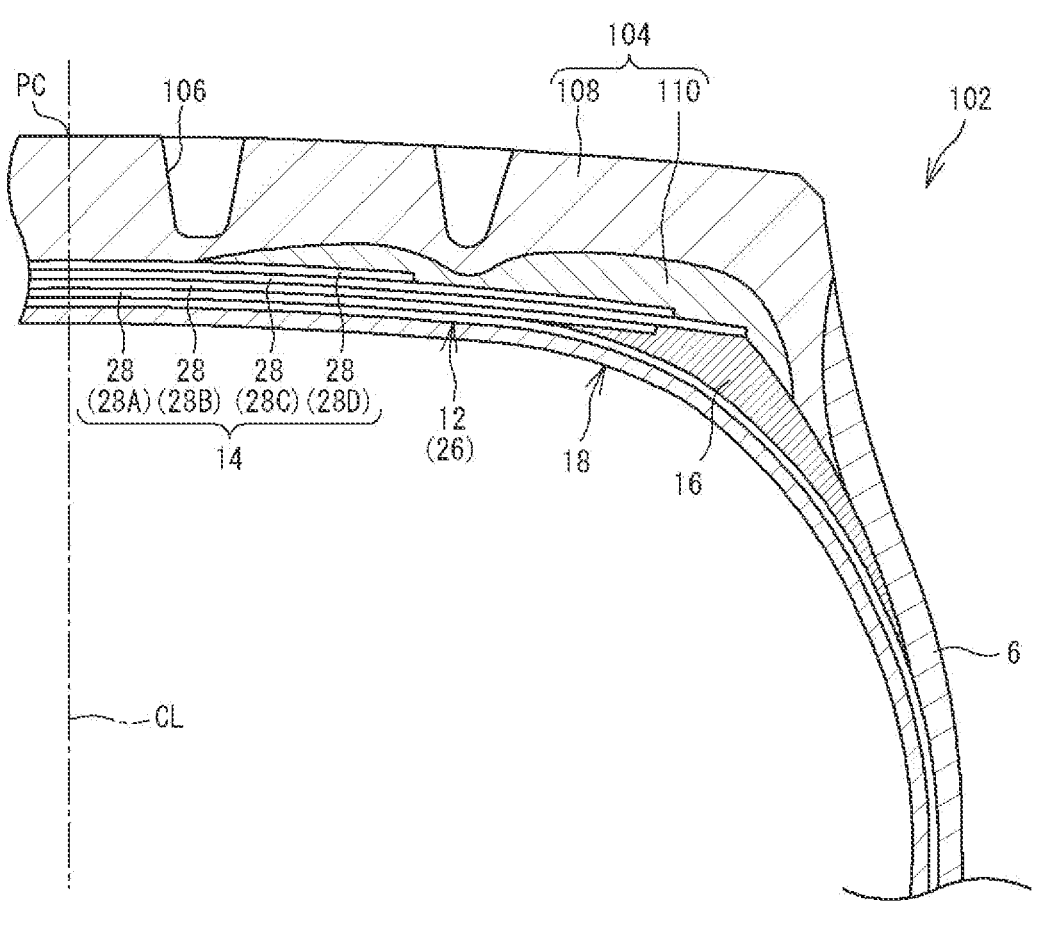
FIG. 2 is a cross-sectional view showing a part of a tire used in the production of the retreaded tire.

The tire 2 is a retreaded tire produced using a tire 102 shown in FIG. 2.

The tire 2 shown in FIG. 1 is obtained by shaving a tread 104 of the tire 102 and reconstructing the tread 4 as a new tread.

In the retreaded tire 2, a portion other than the reconstructed tread 4 is also referred to as base tire BT.

The tire 2 which is a retreaded tire includes the base tire BT and the tread 4.

The configuration of the portion other than the tread 4 of the tire 2, that is, the base tire BT, is the same as the configuration of the tire 102. In the tire 102 shown in FIG. 2, the same components as those of the tire 2 are designated by the same reference characters as those for the tire 2, and the description thereof is omitted.

The tread 104 of the tire 102 shown in FIG. 2 is also referred to as original tread in order to distinguish the tread 104 from the tread 4 of the tire 2 shown in FIG. 1.

The original tread 104 of the tire 102 (hereinafter referred to as original tire), which is the basis of the base tire BT, is also formed from a crosslinked rubber. As shown in FIG. 2, the original tread 104 is stacked on the belt 14 on the outer side of the carcass 12. The original tread 104 covers the entire belt 14. Grooves 106 are also formed on the original tread 104.

The original tread 104 includes a cap portion 108 and a base portion 110.

The cap portion 108 comes into contact with a road surface. The cap portion 108 is formed from a crosslinked rubber for which wear resistance and grip performance are taken into consideration. The cap portion 108 is harder than the sidewall 6.

The base portion 110 is located radially inward of the cap portion 108. The entire base portion 110 is covered with the cap portion 108. The base portion 110 is formed from a crosslinked rubber for which low heat generation properties are taken into consideration. The base portion 110 does not come into contact with a road surface unless the cap portion 108 is worn and the base portion 110 is exposed. For the base portion 110, unlike the cap portion 108, wear resistance and grip performance are not taken into consideration. The base portion 110 is softer than the cap portion 108. The base portion 110 has stiffness substantially equal to that of the sidewall 6.

The cap portion 108 of the tire 2 has a complex elastic modulus of not less than 3 MPa and not greater than 11 MPa. The base portion 110 has a complex elastic modulus of not less than 1 MPa and not greater than 8 MPa.

A portion between the tread 4 and the belt 14 in the tire 2 is the original tread 104 which remains in the base tire BT as a result of shaving the original tread 104 to prepare the base tire BT. As described above, the original tread 104 includes the cap portion 108 and the base portion 110.

As shown in FIG. 2, in the original tire 102, the entire base portion 110 is covered with the cap portion 108. An axially outer portion of the original tread 104 in the base tire BT, that is, an end portion of the original tread 104, is the cap portion 108 (hereinafter referred to as outer cap portion 108s), and the base portion 110 is located axially inward of the outer cap portion 108s.

The original tread 104 of the base tire BT includes the outer cap portion 108s which forms the end portion thereof. As shown in FIG. 1, the outer cap portion 108s is located axially outward of the end of the belt 14. The outer cap portion 108s is located between the base portion 110 and the sidewall 6 in the axial direction.

In FIG. 1, a solid line indicated by reference character BD indicates the boundary between the base tire BT and the tread 4. The boundary BD is a formed surface that is formed by shaving the original tread 104 of the original tire 102. A position indicated by reference character ME is an end of the formed surface BD. As shown in FIG. 1, the end ME of the formed surface BD is located radially outward of the maximum width position PW. The formed surface BD is located radially outward of the maximum width position PW.

The tire 2 further includes a tag member 30. As shown in FIG. 1, the tag member 30 is located between the base tire BT and the tread 4. The tag member 30 is located at the boundary between the base tire BT and the tread 4, that is, on the formed surface BD.

Figure 3:
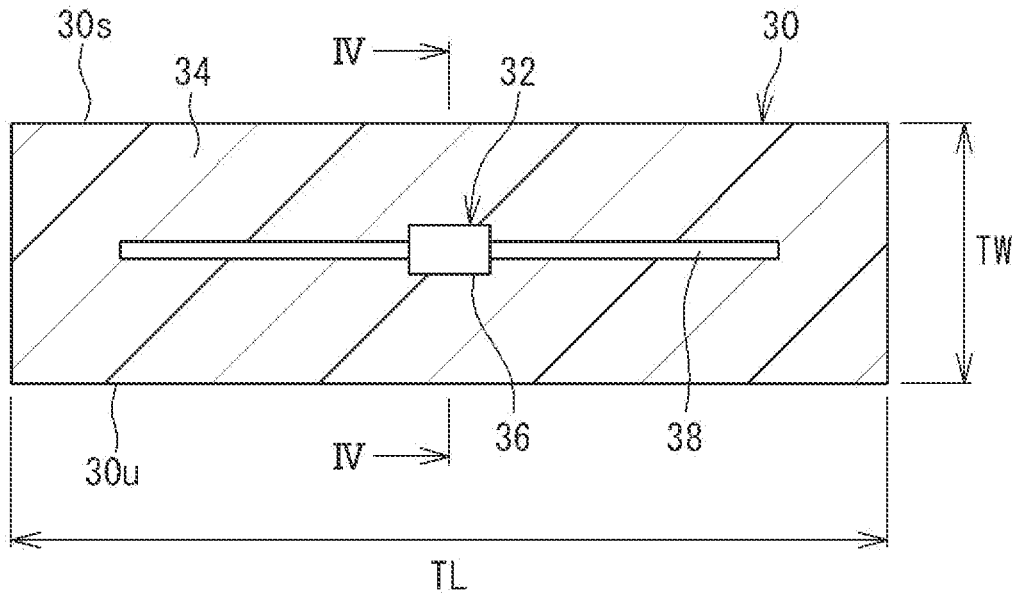
FIG. 3 is a plan view of a tag member.
Figure 4:
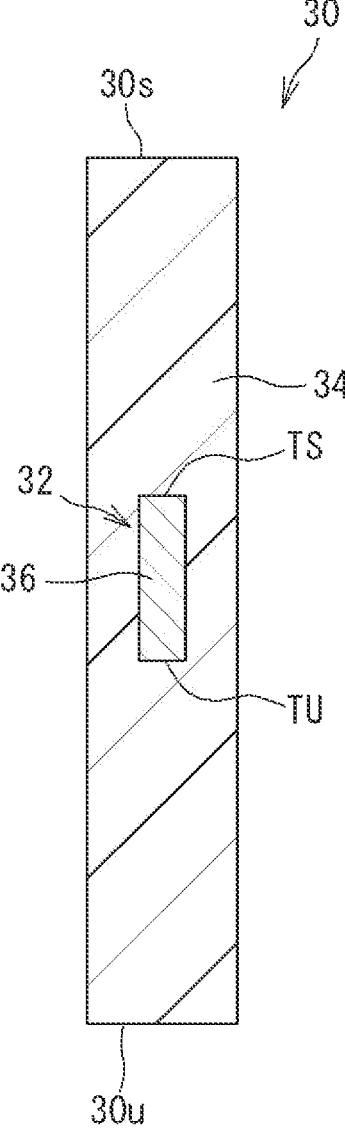
FIG. 4 is a cross-sectional view taken along a line IV-IV in FIG. 3.

FIG. 3 is a plan view of the tag member 30. FIG. 4 is a cross-sectional view taken along a line IV-IV in FIG. 3.

The tag member 30 has a plate shape. The tag member 30 is long in a length direction thereof and short in a width direction thereof. As shown in FIG. 1, in the tire 2, the tag member 30 is placed such that a first end 30s in the width direction thereof is located on the equator PC side of the tire 2 and a second end 30u in the width direction thereof is located on the bead 10 side of the tire 2. The tag member 30 is placed such that the length direction thereof is along the circumferential direction of the tire 2.

The tag member 30 includes an RFID tag 32. The RFID tag 32 is located at the center of the tag member 30. In FIG. 3, for convenience of description, the RFID tag 32 is shown by a solid line, but the entirety thereof is covered with a protector 34. The tag member 30 includes the protector 34 and the RFID tag 32 which is enclosed in the protector 34.

The protector 34 is a crosslinked product of a rubber composition. The protector 34 has stiffness equal to or higher than the stiffness of the sidewall 6. Formation of a good communication environment is considered, and a crosslinked rubber having high electrical resistance is used for the protector 34. The protector 34 is formed from a rubber that has high insulation properties.

The protector 34 has a complex elastic modulus of not less than 2 MPa and not greater than 8 MPa.

Although not described in detail, the RFID tag 32 is a small and lightweight electronic component that includes: a semiconductor chip 36 obtained by making a transmitter/receiver circuit, a control circuit, a memory, etc., into a chip; and an antenna 38. Upon receiving interrogation radio waves, the RFID tag 32 uses the radio waves as electrical energy and transmits various data in the memory as response radio waves. The RFID tag 32 is a type of passive radio frequency identification transponder.

The tag member 30 is a plate-shaped member in which the RFID tag 32 is covered with a crosslinked rubber. From the viewpoint of reducing the risk of damage to the RFID tag 32 and forming a good communication environment, the thickness of the tag member 30 in the tire 2 is preferably not less than 1.0 mm and not greater than 2.5 mm. The thickness of the tag member 30 in the tire 2 is represented as the maximum thickness of the tag member 30 at a portion including the semiconductor chip 36.

A length TL of the tag member 30 before embedding in the tire 2 is not less than 60 mm and not greater than 80 mm. A width TW thereof is not less than 10 mm and not greater than 20 mm.

In FIG. 1, a position indicated by reference character TS is a first end of the RFID tag 32 (specifically, the semiconductor chip 36). A position indicated by reference character TU is a second end of the semiconductor chip 36, that is, a second end of the RFID tag 32.

In the present invention, the case where the second end TU of the RFID tag 32 in the tire 2 is located radially outward of a position serving as a reference (hereinafter referred to as reference position) is the case where the RFID tag 32 is located radially outward of the reference position. The case where the first end TS of the RFID tag 32 in the tire 2 is located radially inward of the reference position is the case where the RFID tag 32 is located radially inward of the reference position.

The case where the second end TU of the RFID tag 32 is located axially inward of the reference position is the case where the RFID tag 32 is located axially inward of the reference position. The case where the first end TS of the RFID tag 32 is located axially outward of the reference position is the case where the RFID tag 32 is located axially outward of the reference position.

As shown in FIG. 1, the tag member 30 is located on the formed surface BD on the axially outer side of the end of the belt 14. The tag member 30 is located radially inward of the end of the belt 14.

The tire 2 shown in FIG. 1 includes the base tire BT, the tread 4, and the tag member 30. The base tire BT has the formed surface BD made by shaving the original tread 104 of the original tire 102. The tread 4 is a new tread reconstructed on the formed surface BD. The tag member 30 is located between the base tire BT and the tread 4.

The tire 2 is a retreaded tire and has the tag member 30. The tire 102 which is the basis of the tire 2, that is, the original tire 102, does not have the tag member 30. That is, the retreaded tire 2 in which the tag member 30 is incorporated is obtained from the tire 102 in which the tag member 30 is not incorporated. Hereinafter, a production method for the retreaded tire 2 in which the tag member 30 is incorporated will be described with reference to FIG. 5 to FIG. 7.

The production method for the retreaded tire 2 includes a grinding step of the original tread 104, an attaching step of the tag member 30, and a reconstructing step of the tread 4.

In the grinding step, the original tread 104 is shaved from the original tire 102, for example, by buffing the original tread 104. Accordingly, the formed surface BD is formed.

Figure 5:
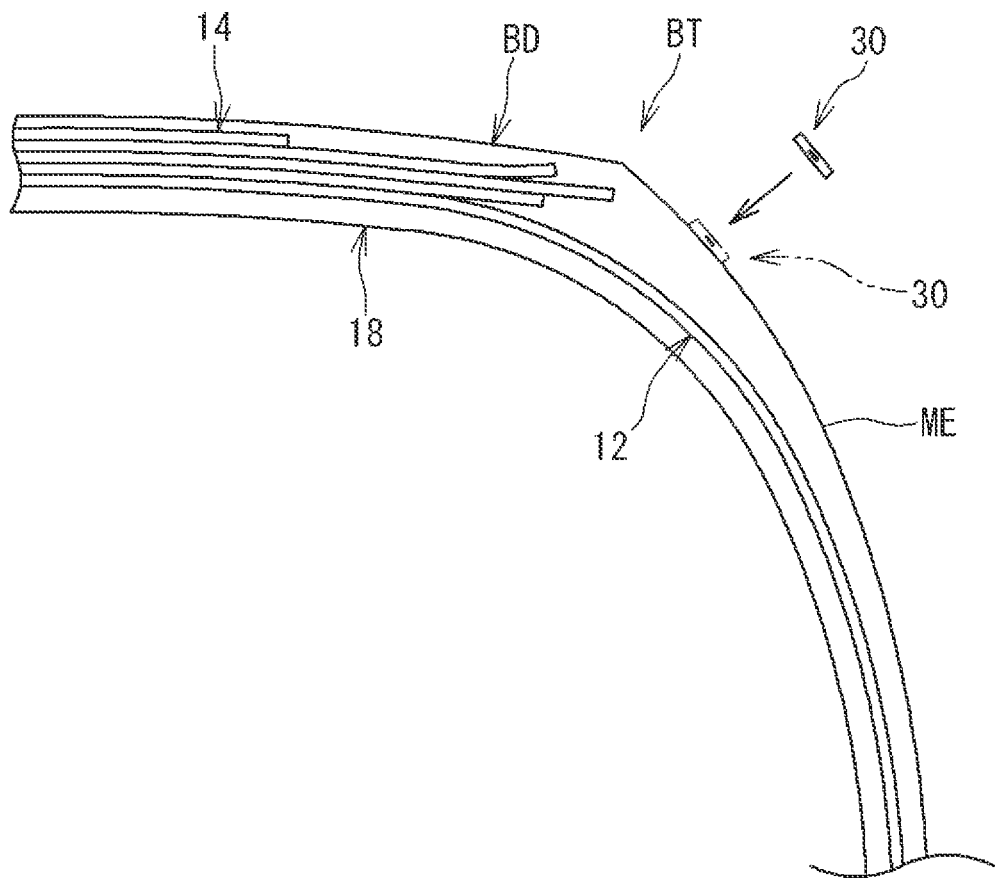
FIG. 5 illustrates a production method for the retreaded tire.

The grinding step is a step of shaving the original tread 104 from the original tire 102. In the grinding step, the base tire BT shown in FIG. 5 is obtained.

In this production method, a device for shaving the original tread 104 is not particularly limited, as long as the original tread 104 can be shaved from the original tire 102 to form the formed surface BD. A grinding device that is commonly used in the production of retreaded tires can also be used in this production method.

The tire 102 used to form the base tire BT may be a tire whose tread has been worn due to running, or may be a new tire whose tread has not been worn.

After the preparation of the base tire BT is completed, the attaching step is started.

In the attaching step, the tag member 30 is attached to the formed surface BD as shown in FIG. 5. As described above, the protector 34 in the tire 2 shown in FIG. 1 is a crosslinked product of a rubber composition. In contrast, the protector 34 in the attaching step is in an unvulcanized state.

In the attaching step, the tag member 30 in which the protector 34 is in an unvulcanized state is attached to the formed surface BD made by shaving the original tread 104.

After the attachment of the tag member 30 is completed, the reconstructing step is started.

Figure 6:
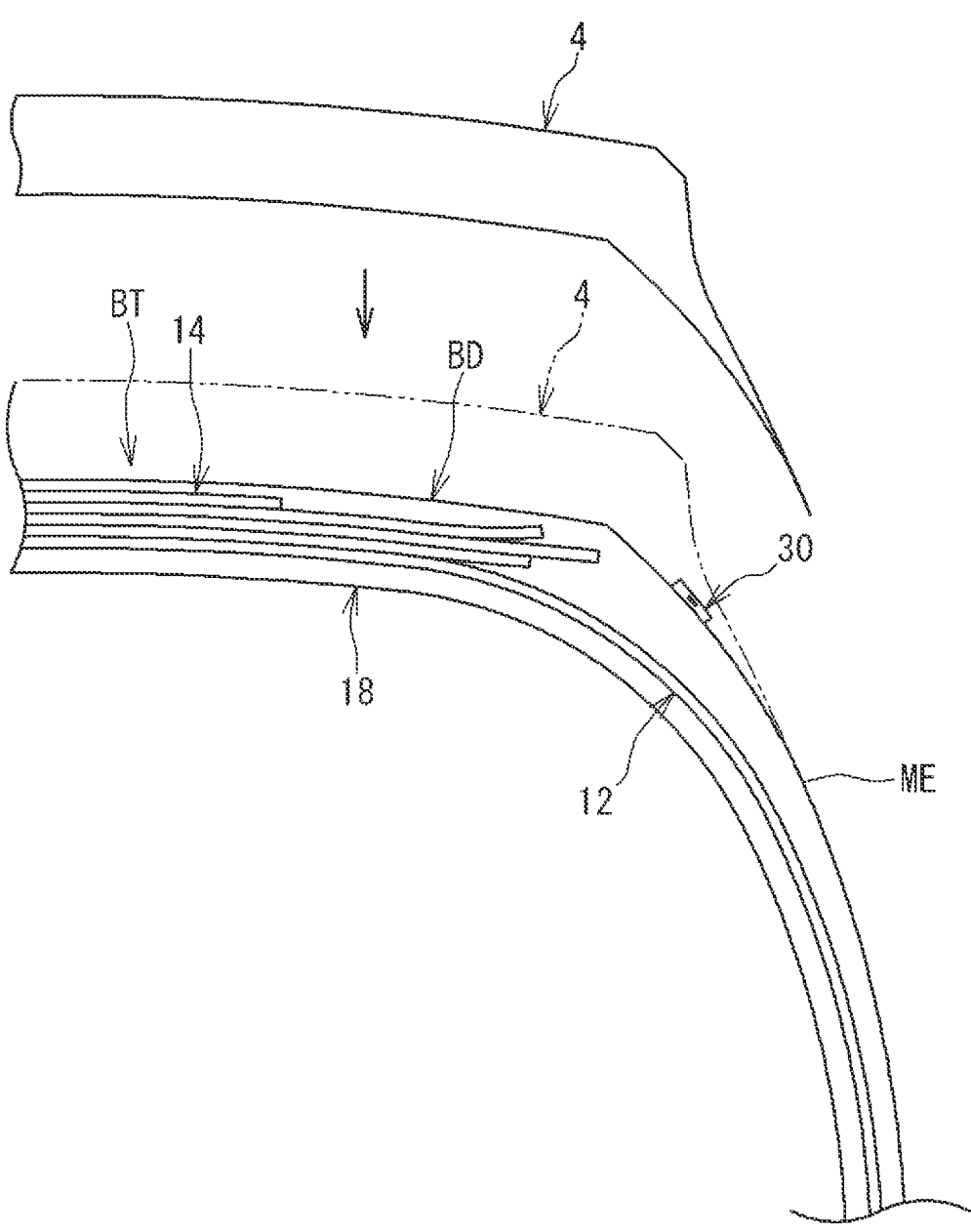
FIG. 6 illustrates the production method for the retreaded tire.

In the reconstructing step, a new tread 4 is reconstructed as shown in FIG. 6.

Figure 7:
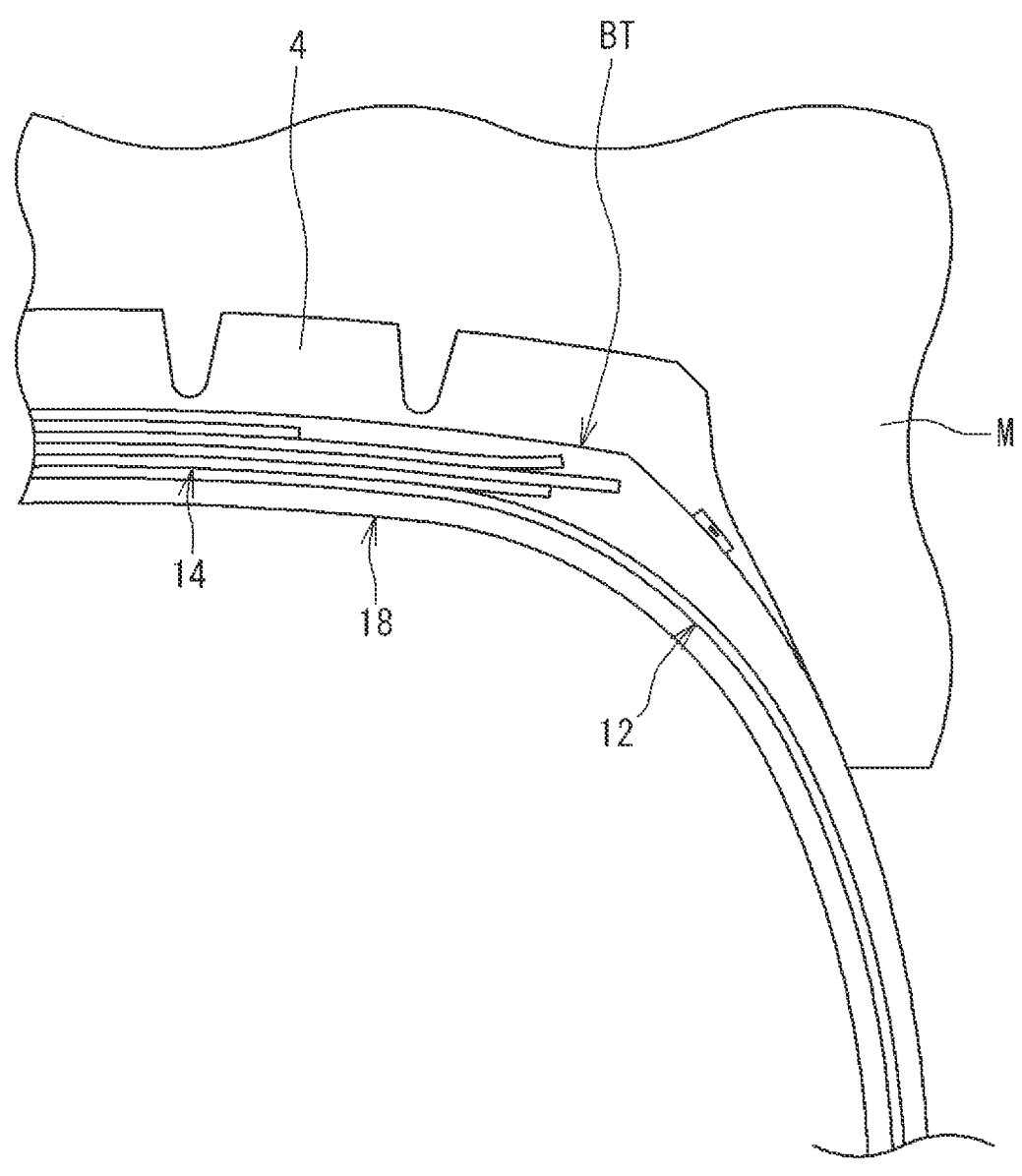
FIG. 7 illustrates the production method for the retreaded tire.

An unvulcanized tread 4 (hereinafter referred to as raw tread 4) is attached to the formed surface BD to which the tag member 30 has been attached. As shown in FIG. 7, the base tire BT to which the raw tread 4 has been attached is placed into a mold M. The raw tread 4 is pressurized and heated in the mold M for a predetermined molding time at a predetermined molding temperature. The rubber composition of the raw tread 4 is crosslinked to obtain the tread 4 which is a crosslinked product of the rubber composition.

In the reconstructing step, the tread 4 which is a crosslinked product of the rubber composition is reconstructed as a new tread on the formed surface BD to which the tag member 30 has been attached. Accordingly, the tire 2 shown in FIG. 1 is obtained.

In the production method, a device used for crosslinking the raw tread 4 is not particularly limited, as long as the raw tread 4 is crosslinked to obtain the tire 2 having the tread 4. A vulcanizing device that is commonly used in the production of retreaded tires can also be used in this production method.

In the production method, a vulcanized tread 4 may be used to reconstruct a new tread. In this case, in the reconstructing step, an adhesive is applied to the formed surface BD to which the tag member 30 has been attached, and then the vulcanized tread 4 is attached to the formed surface BD. The tread 4 and the base tire BT are heated, for example, by placing the base tire BT, to which the vulcanized tread 4 has been attached, into a steam boiler. The tread 4 is joined to the base tire BT to obtain the tire 2 shown in FIG. 1. In this case as well, the tread 4 which is a crosslinked product of the rubber composition is reconstructed as a new tread.

In the production method, the RFID tag 32 is incorporated into the tire 2. Since the RFID tag 32 is fixed to the tire 2, risks, such as peeling of the RFID tag 32 and intentional replacement of the RFID tag 32 with another RFID tag, are reduced. The tire 2 can increase the reliability of information written in the RFID tag 32.

As described above, the tag member 30 is located radially inward of the end of the belt 14. The RFID tag 32 is placed so as to be spaced apart from the end of the belt 14 which includes the steel cords. Radio waves are less likely to be disturbed, so that a good communication environment is formed between the RFID tag 32 and a communication device (not shown). Writing of data to the RFID tag 32 and reading of data recorded in the RFID tag 32 are accurately performed.

Since the RFID tag 32 is placed so as to be spaced apart from the end of the belt 14, concentration of strain on the RFID tag 32 which may damage the RFID tag 32 or cause damage starting from the RFID tag 32 is suppressed. The tire 2 can reduce the risk of occurrence of damage due to the provision of the RFID tag 32.

As described above, the tire 2 is a heavy duty tire. Each shoulder portion of the tire 2 is thick. The RFID tag 32 is provided at the shoulder portion which is particularly thick in the tire 2. Therefore, in the reconstructing step, the tread 4 is heated, but the heat is less likely to be propagated to the protector 34 of the tag member 30. Moreover, in order to prevent occurrence of excessive vulcanization and reversion in the base tire BT, the molding temperature is set to be lower than a molding temperature that is set in a normal production method for obtaining a tire from an unvulcanized tire. Therefore, vulcanization of the protector 34 may become insufficient.

In the tire 2, however, when, in a vulcanization rate curve at 160° C. obtained using an oscillating disc curemeter, the minimum value of torque is denoted by ML, the maximum value of the torque is denoted by MH, the difference (MH−ML) therebetween is denoted by ME, and a time taken for the torque to reach ML+0.1ME is defined as an initial vulcanization time t10, the initial vulcanization time t10 of the rubber composition for the protector 34 is shorter than the initial vulcanization time t10 of the rubber composition for the tread 4 as a new tread.

The vulcanization rate of the rubber composition for the protector 34 is higher than that of the rubber composition for the tread 4. Even when the above-described molding temperature and molding time are set such that the tread 4 can be sufficiently vulcanized while prevention of occurrence of excessive vulcanization and reversion in the base tire BT is taken into consideration, the protector 34 is sufficiently vulcanized. The production method can prevent insufficient vulcanization of the protector 34.

The production method allows a retreaded tire, in which an RFID tag is incorporated, to be produced while taking into consideration formation of a good communication environment, reduction of the risk of damage due to the RFID tag, and prevention of occurrence of excessive vulcanization and reversion in the base tire BT. Since the RFID tag is fixed to the retreaded tire, risks, such as peeling of the RFID tag and intentional replacement of the RFID tag with another RFID tag, are reduced. This retreaded tire can increase the reliability of information written in the RFID tag. This retreaded tire enables information management with the RFID tag.

As described above, in the production method, the initial vulcanization time t10 of the rubber composition for the protector 34 is shorter than the initial vulcanization time t10 of the rubber composition for the tread 4. In particular, the initial vulcanization time t10 for the protector 34 is not longer than 2.5 minutes. Therefore, the production method allows the tread 4 and the protector 34 to be sufficiently vulcanized while preventing occurrence of excessive vulcanization and reversion in the base tire BT. The production method allows a high-quality retreaded tire, in which an RFID tag is incorporated, to be produced while achieving formation of a good communication environment and reduction of the risk of damage due to the RFID tag. From this viewpoint, the initial vulcanization time t10 for the protector 34 is preferably not longer than 2.5 minutes and more preferably not longer than 2.0 minutes.

The tag member 30 is located between the original tread 104 and the tread 4. If vulcanization of the protector 34 of the tag member 30 begins immediately after the start of pressurizing and heating the raw tread 4 in the mold M, it may be impossible to sufficiently join the protector 34 of the tag member 30 to each of the original tread 104 and the tread 4. In order to sufficiently join the protector 34 to each of the original tread 104 and the tread 4, it is preferable that the rubber composition for the protector 34 maintains its fluidity for a while after the start of pressurizing and heating the raw tread 4 in the mold M. From this viewpoint, the initial vulcanization time t10 for the protector 34 is preferably not shorter than 1.0 minute.

The tag member 30 is located between the end of the belt 14 and the maximum width position PW of the tire 2 in the radial direction. The RFID tag 32 of the tag member 30 is placed so as to be spaced apart from the end of the belt 14.

Figure 8:
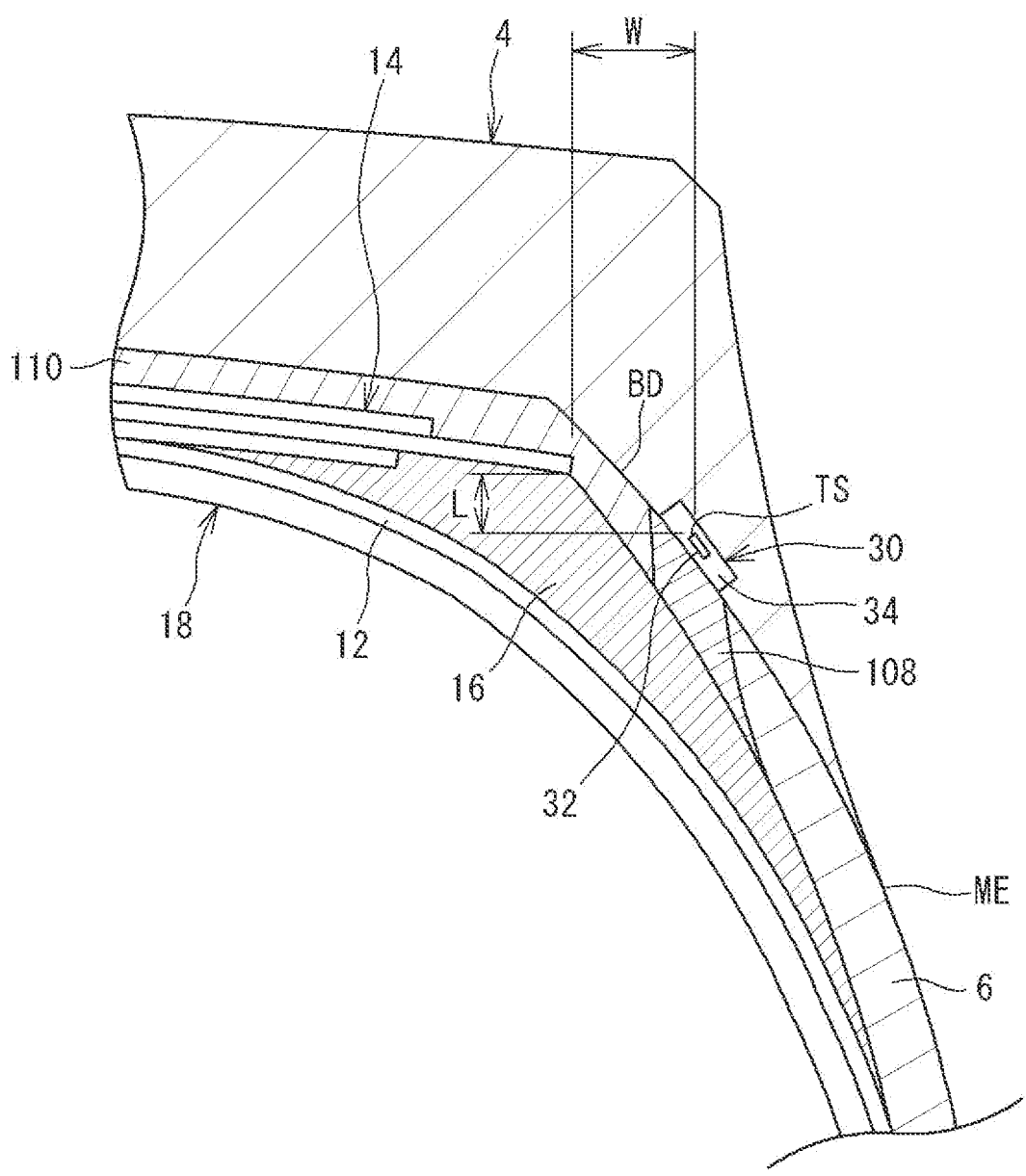
FIG. 8 is a cross-sectional view showing a shoulder portion of the retreaded tire.

FIG. 8 shows the shoulder portion of the tire 2 shown in FIG. 1. In FIG. 8, a length indicated by a double-headed arrow L is the distance in the radial direction from the end of the belt 14 to the first end TS of the RFID tag 32. The length indicated by a double-headed arrow W is the distance in the axial direction from the end of the belt 14 to the first end TS of the RFID tag 32.

The distance L in the radial direction from the end of the belt 14 to the first end TS of the RFID tag 32 is preferably not less than 4 mm. Accordingly, the RFID tag 32 is placed so as to be appropriately spaced apart from the end of the belt 14. The tire 2 can effectively achieve formation of a good communication environment and reduction of the risk of damage due to the RFID tag 32. From this viewpoint, the distance L in the radial direction is more preferably not less than 5 mm.

A preferred upper limit of the distance L in the radial direction is determined as appropriate in consideration of prevention of exposure of the RFID tag and the influence of the carcass cords included in the carcass 12 on the communication environment.

The distance W in the axial direction from the end of the belt 14 to the first end TS of the RFID tag 32 is preferably not less than 4 mm. Accordingly, the RFID tag 32 is placed so as to be appropriately spaced apart from the end of the belt 14. The tire 2 can effectively achieve formation of a good communication environment and reduction of the risk of damage due to the RFID tag 32. From this viewpoint, the distance W in the axial direction is more preferably not less than 5 mm.

A preferred upper limit of the distance W in the axial direction is determined as appropriate in consideration of prevention of exposure of the RFID tag 32 and the influence of the carcass cords included in the carcass 12 on the communication environment.

As shown in FIG. 1, the end of the belt 14 is covered with the base portion 110 of the original tread 104. The cap portion 108 of the original tread 104 is located axially outward of the base portion 110. The sidewall 6 is located axially outward of the cap portion 108. The above-described formed surface BD is formed by the base portion 110, the cap portion 108, and the sidewall 6. As described above, the RFID tag 32 of the tag member 30 is placed so as to be spaced apart from the end of the belt 14. The tag member 30 shown in FIG. 1 is stacked on the cap portion 108, but the tag member 30 may be stacked on the base portion 110 or on the sidewall 6 as long as the RFID tag 32 is placed so as to be spaced apart from the end of the belt 14.

The complex elastic modulus of the protector 34 is the same as the complex elastic modulus of the sidewall 6, or higher than the complex elastic modulus of the sidewall 6. The complex elastic modulus of the protector 34 is lower than the complex elastic modulus of the tread 4 as a new tread.

The tread 4 and the cap portion 108 are harder than the protector 34.

In the case where the tag member 30 is interposed between the tread 4 and the cap portion 108 like the tag member 30 shown in FIG. 1, the tread 4 and the cap portion 108 which are harder than the protector 34 reinforce the periphery of the tag member 30. Stress is less likely to be concentrated on the RFID tag 32 of the tag member 30. The tire 2 can reduce the risk of damage due to the RFID tag 32.

As described above, the base portion 110 has stiffness substantially equal to that of the sidewall 6. Since the protector 34 of the tag member 30 has a complex elastic modulus equal to or higher than the complex elastic modulus of the sidewall 6, the complex elastic modulus of the protector 34 is higher than the complex elastic modulus of the base portion 110.

In the case where the tag member 30 is interposed between the tread 4 and the base portion 110, the base portion 110 which is softer than the protector 34 is located inward of the tag member 30, and the tread 4 which is harder than the protector 34 is located outward of the tag member 30. Since the base portion 110 contributes to alleviation of stress, stress is less likely to be concentrated on the RFID tag 32. In this case as well, the tire 2 can reduce the risk of damage due to the RFID tag 32.

As described above, the protector 34 of the tag member 30 has a complex elastic modulus equal to or higher than the complex elastic modulus of the sidewall 6. Therefore, in the case where the tag member 30 is interposed between the tread 4 and the sidewall 6, the sidewall 6 which has stiffness substantially equal to that of the protector 34 or is softer than the protector 34 is located inward of the tag member 30, and the tread 4 which is harder than the protector 34 is located outward of the tag member 30. Since the sidewall 6 contributes to alleviation of stress, stress is less likely to be concentrated on the RFID tag 32. In this case as well, the tire 2 can reduce the risk of damage due to the RFID tag 32.

The base portion 110 is located at a position closest to the end of the belt 14 in the base portion 110, the cap portion 108, and the sidewall 6 on which the tag member 30 is to be stacked. From the viewpoint that the RFID tag 32 can stably perform its function, the tag member 30 is preferably located between the tread 4 and the cap portion 108 or between the tread 4 and the sidewall 6.

As described above, the cushion layer 16 has a complex elastic modulus substantially equal to that of the sidewall 6. The tag member 30 may be placed between the tread 4 and the cushion layer 16. In this case, the above-described formed surface BD is formed so as to include the cushion layer 16.

As is obvious from the above description, according to the present invention, the retreaded tire 2 in which an RFID tag is mounted on a tire in which no RFID tag is incorporated while formation of a good communication environment and reduction of the risk of damage due to the RFID tag are taken into consideration, and that enables information management with the RFID tag, is obtained.

The technology that mounts an RFID tag on a tire in which no RFID tag is incorporated while formation of a good communication environment and reduction of the risk of damage due to the RFID tag are taken into consideration, and enables information management with the RFID tag, can be applied to various tires such as a tire for a small truck and a tire for a passenger car in addition to a heavy duty tire. The present invention exhibits a remarkable effect when applied particularly to a tire having thick shoulder portions such as a heavy duty tire and a tire for a small truck.

The above-described technology that mounts an RFID tag on a tire in which no RFID tag is incorporated while formation of a good communication environment and reduction of the risk of damage due to the RFID tag are taken into consideration, and enables information management with the RFID tag, can be applied to various tires.

What is claimed is:

1. A method for producing a retreaded tire, the method comprising:

providing from a tire including a pair of beads, a carcass extending on and between the pair of beads, a shaved tread radially outward of the carcass and configured to come into contact with a road surface, a belt stacked on the carcass on a radially inner side of the shaved tread, and a pair of sidewalls axially outward of the carcass, the shaved tread including a formed surface that is radially outward of a maximum width position of the tire;

attaching a tag member, including a protector in an unvulcanized state and an RFID tag enclosed in the protector, to the formed surface at a location which is radially inward of an end of the belt; and reconstructing a new tread which is a crosslinked product of a rubber composition, on the formed surface to which the tag member has been attached, wherein an initial vulcanization time of a rubber composition for the protector is shorter than an initial vulcanization time of the rubber composition for the new tread.

2. The method for producing the retreaded tire according to claim 1, wherein a distance in a radial direction from the end of the belt to a first end of the RFID tag is not less than 4 mm.

3. The method for producing the retreaded tire according to claim 2, wherein a distance in an axial direction from the end of the belt to a first end of the RFID tag is not less than 4 mm.

4. The method for producing the retreaded tire according to claim 2, wherein a distance in an axial direction from the end of the belt to a first end of the tag member is not less than 4 mm.

5. The method for producing the retreaded tire according to claim 1, wherein an initial vulcanization time for the protector is not longer than 2.5 minutes.

6. The method for producing the retreaded tire according to claim 1, wherein a complex elastic modulus of the protector is the same as a complex elastic modulus of at least one of the sidewalls, or higher than the complex elastic modulus of at least one of the sidewalls, and the complex elastic modulus of the protector is lower than a complex elastic modulus of the new tread.

7. A method for producing a retreaded tire including a tag member including a protector which is a crosslinked product of a rubber composition and an RFID tag which is enclosed in the protector, the method comprising:

from a tire including a pair of beads, a carcass extending on and between the pair of beads, a tread radially outward of the carcass and configured to come into contact with a road surface, a belt stacked on the carcass on a radially inner side of the tread, and a pair of sidewalls axially outward of the carcass, shaving the tread;

attaching the tag member in which the protector is in an unvulcanized state, to a formed surface made by shaving the tread; and reconstructing a new tread which is a crosslinked product of a rubber composition, on the formed surface to which the tag member has been attached, wherein the formed surface is radially outward of a maximum width position of the tire, the tag member is radially inward of an end of the belt, and an initial vulcanization time of the rubber composition for the protector is shorter than an initial vulcanization time of the rubber composition for the new tread.

8. The method for producing the retreaded tire according to claim 7, wherein the initial vulcanization time for the protector is not longer than 2.5 minutes.

9. The method for producing the retreaded tire according to claim 7, wherein a complex elastic modulus of the protector is the same as a complex elastic modulus of at least one of the sidewalls, or higher than the complex elastic modulus of at least one of the sidewalls, and the complex elastic modulus of the protector is lower than a complex elastic modulus of the new tread.

10. The method for producing the retreaded tire according to claim 7, wherein a distance in a radial direction from the end of the belt to a first end of the RFID tag is not less than 4 mm.

11. The method for producing the retreaded tire according to claim 10, wherein a distance in an axial direction from the end of the belt to a first end of the RFID tag is not less than 4 mm.

12. The method for producing the retreaded tire according to claim 10, wherein a distance in an axial direction from the end of the belt to a first end of the tag member is not less than 4 mm.

* * * * *